C. GUGGENBUEHLER.
UNIVERSAL LUBRICATING DEVICE.
APPLICATION FILED DEC. 30, 1919.
Patented Feb. 1, 1921.
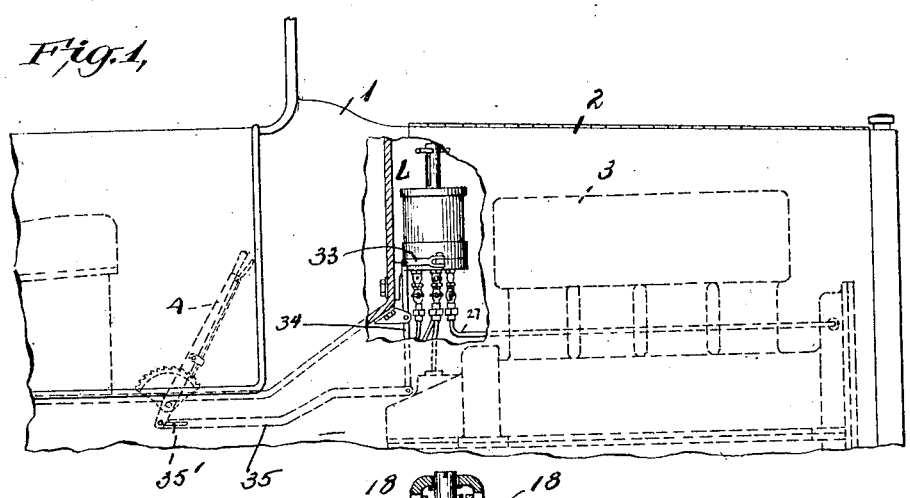
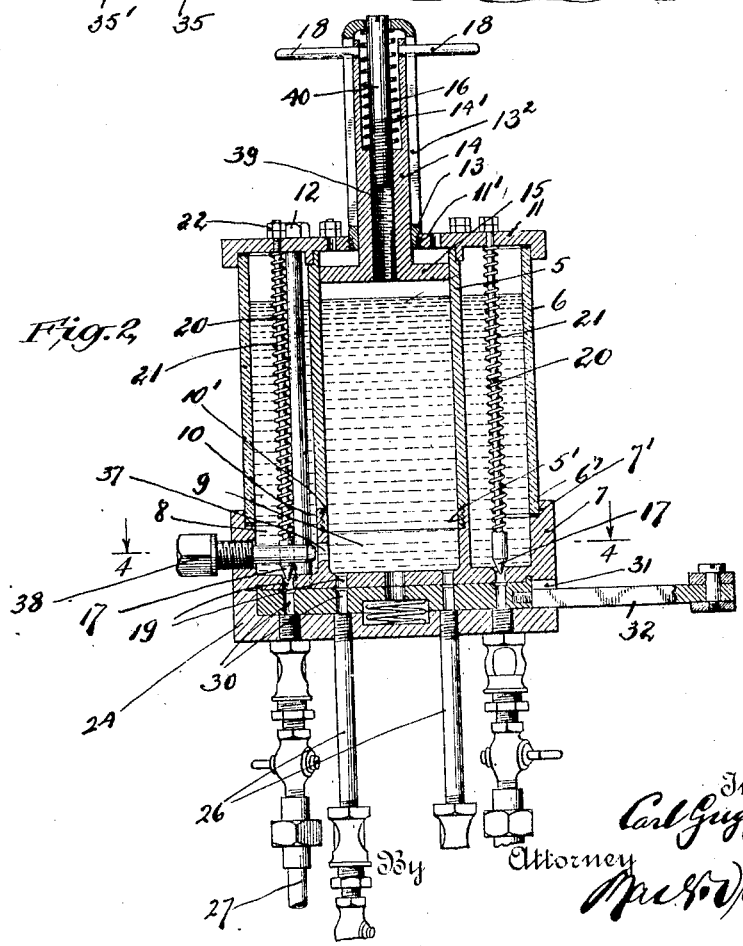

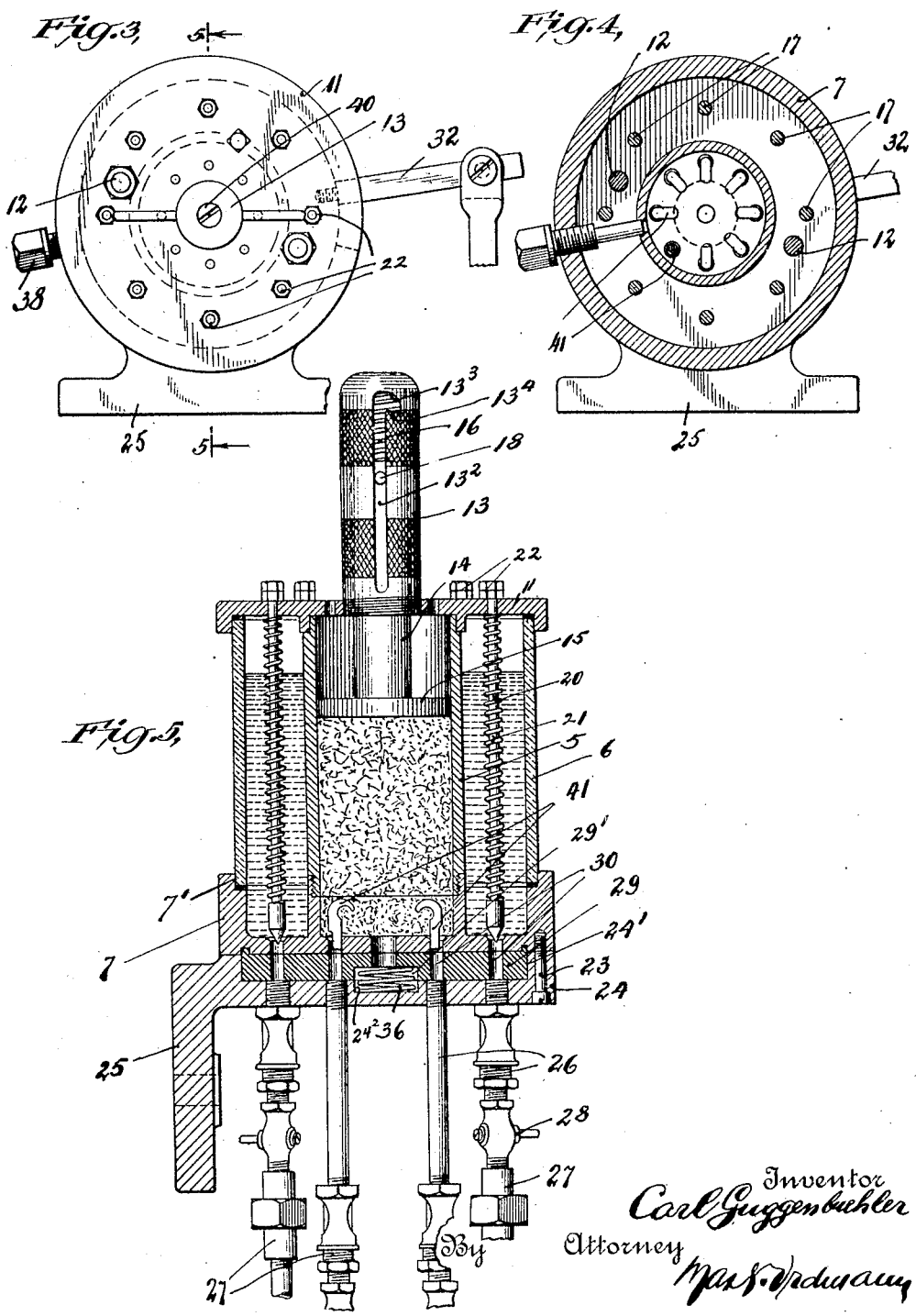

UNITED STATES PATENT OFFICE.

CARL GUGGENBUEHLER, OF NEWARK, NEW JERSEY.

UNIVERSAL LUBRICATING DEVICE.

1,367,252.  Specification of Letters Patent.  Patented Feb. 1, 1921.

Application filed December 30, 1919. Serial No. 348,313.

*To all whom it may concern:*

Be it known that I, CARL GUGGENBUEHLER, a citizen of Germany, residing at Newark, in the county of Essex and State of New Jersey, have invented certain new and useful Improvements in Universal Lubricating Devices, of which the following is a specification.

The present invention relates to lubricating devices and has for its principal object to provide a self-feeding lubricating device which can be employed with any kind of machinery and whereby the feeding of the lubricant will be automatically stopped when the machine is arrested.

Another object of my invention is to construct the device so that it will serve as a universal lubricator, whereby the lubricant will be fed to all parts of the machinery from a single center.

Another object of my invention is to provide a self-feeding lubricant device which can be easily and conveniently applied to power driven vehicles to feed from a single center a lubricant to different parts of the vehicle, and whereby individual lubricators such as grease cups may be entirely dispensed with.

A further object is to construct it so that it may be used simultaneously for liquid lubricants and grease.

My invention is particularly advantageous for automobiles or the like.

Automobiles are equipped with a number of removable grease cups which from time to time have to be refilled. The refilling of the grease cups not only consumes considerable time and is very inconvenient, but entails much waste of material.

Instead of hand-adjustable grease cups self-feeding cups have been recently introduced. But these cups are objectionable because they entail still more waste, since the grease is fed continuously, even when the machine is not in use.

With my invention the feeding of the lubricant will be automatically controlled so that it will only take place while the machine is propelled, but will be discontinued or interrupted when the machine is brought to a stand still.

When applied to a motor vehicle the control of the feed of the lubricant may be effected by the movement of such part of the vehicle which serves to arrest the machine, as for instance, the emergency brake or the like. When used in connection with other machinery the control of the feed may be effected by the adjustment of the belt shifter or the like.

In the following I shall describe the device in connection with an automobile, it being understood that without material changes the device may be applied to locomotives as well as stationary machinery of any kind.

With these and other objects in view, my invention consists in the novel construction, combination and arrangement of parts as will be fully described and defined in the appended claims.

In the accompanying drawings which form part of this specification, Figure 1 illustrates the arrangement of my device on a motor vehicle and the means for controlling the same from the driver's seat; Fig. 2 is a vertical section of the device proper; Fig. 3 is a top plan view thereof; Fig. 4 is a cross section on line 4—4 of Fig. 2 and Fig. 5 is a similar vertical section as and at a right angle to that of Fig. 2.

Referring to the drawing more in detail, let 1 denote an automobile of which 2 is the casing inclosing the motor 3, etc., and 4 is the emergency brake lever operated from the driver's seat. The lubrication device L which may be arranged in the casing 2, as in the example shown in Fig. 1, or at any other easily accessible place, according to the present embodiment of my invention, consists of two concentrically arranged cylindrical bodies 5, 6, of which the inner one may be made of metal and primarily serve as a grease container, and the outer one may be made of glass and serve as an oil container.

The lower open ends 5', 6' of the cylinders are adapted to be closed by a metal cap shaped bottom 7 which is formed with two chambers, 8, 9, separated by an annular wall 10. The inner or central chamber 8 constitutes a continuation of the central or inner chamber formed by the body 5, while the annular chamber 9 constitutes a continuation of the outer annular chamber formed by the outer cylinder 6.

The cap may be secured in position by forming the upper end of the annular wall 10 with screw thread at 10' to screw on the correspondingly threaded lower end 5' of the cylinder 5. The glass cylinder 6 may be suitably and tightly supported in an annular groove 7' provided on the inner face of the outer wall of the cap. Mounted over the tops of the cylinders 5 and 6 is a cap shaped lid 11 secured in position by two or more bolts 12, extending through the annular space between the two cylinders 5 and 6 and fixed in the lower cap 7, as shown in Fig. 2. The cap 11 is provided with a central threaded opening 11' in which is screwed a tubular vertical projection 13 in which is slidably borne the stem or rod 14 of a plunger 15 working in the inner metal cylinder 5. The top of the tube 13 is closed and between it and the plunger rod 14 a coil 16 is provided, which acts on the plunger rendering it self advancing. In the example shown the plunger rod is longitudinally grooved as at 14' to form a socket for the spring 16.

To lock the plunger in elevated position when the parts are being assembled or during the refilling of the containers I provide members 18 which are fixed to opposite sides of the plunger rod and project outwardly from the tube 13, through longitudinal slots $13^2$. At the upper ends these slots are formed with lateral grooves $13^3$ so shaped as to form concaved shoulders $13^4$ on which the fingers or members 18 will rest when the plunger is to be supported in raised position.

In the bottom 7 I provide discharge openings 19 for the two cylinders 5 and 6 of which there may be as many as there are parts to be lubricated. These openings are arranged in concentric circular rows, one row being in the chamber 5, 9 and the other in the chamber 6, 8.

The openings 17 for the liquid lubricant may be controlled by valves 19 which may consist of conical valve bodies carried by rods 20 extending longitudinally through the cylinder and suitably guided and secured in the top lid 11. The valves are actuated by springs 21, the tension of which can be adjusted in well known manner by the tightening of nuts 22 carried by the ends of the rods 20.

Fixed to the cap 7, as at 23, is a support 24 which may be formed with a bracket arm 25, whereby it may be fixed to a stationary part of the vehicle as shown in Fig. 1. This support carries pipe sections 26, for the attachment of tubes 27, serving to convey the lubricants to the different parts to be lubricated. Each pipe section 26 may be formed with a cock or valve 28 to stop the flow of lubricant whenever required.

The support 25 is provided on its inner surface with a circular cavity 24' in which is rotatively mounted a valve disk 29 having two concentric circular rows of openings 30, in number and size corresponding to those of the discharge opening 19 and arranged to be in range with the latter and with the openings of the pipe sections 26. The support 24 is provided with an arcuate recess 31 in its circumference through which passes an arm 32 fixed to the body of the valve 29 and whereby the latter may be rotated so as to either displace its openings relative to those in the bottom 7 and thereby stop the feed of the lubricant simultaneously through all tubes, or to bring its openings in range with the discharge openings 19. This arm 32 is designed to be operated automatically from the machine to which the device is applied. In the present example it is shown connected to the emergency brake 4 through the medium of a link 33, a lever 34 and rod 35.

There may be sufficient play provided in the connection between the arm 32 and the brake lever 4, as for instance a slot 35' in the rod 35, as that only when the emergency brake is drawn in to temporarily stop the vehicle, will the valve 29 be operated, while a short pull of the emergency lever, as often necessary while riding down a hill or to avoid an accident, will not affect the valve.

The valve 29 may be held tightly against the bottom of the cap 7 by a spring 36 located between the valve 29 and support 24 in central cavities 29' and $24^2$ provided therein (Figs. 2 and 5).

If it is desired to use liquid lubricants in both receptacles 5 and 6, the opening 37 provided near the bottom of the chamber 9 which ordinarily may be closed by a plug 38 working in the cap 7 may be opened to permit the oil to fill both receptacles to an even level.

To facilitate the recharge of the containers a central bore 39 is provided in the stem 14, and plunger 15 opening into the receptacle 5 and which bore may be normally closed by a plug 40 screwed in said bore.

Since some parts require more greasing than others, the size of the openings 19 in the cylinder 5 may be regulated by hand by means of stoppers 41 or the like (Fig. 5), which removably fit in the discharge openings.

These stoppers are circular in cross section but filed away or flattened on one side so that when inserted in the discharge openings 19 they will leave an opening between themselves and the wall of the discharge openings. According to the size of opening required, plugs varying in the size of their flattened parts may be used.

When the cylinder 5 is to be used for oil, valves similar to those in the cylinder 6 may be employed.

The operation of the device will be understood from the foregoing description.

Since the device may be modified in various ways without departing from the spirit of my invention, I do not wish to restrict myself to the details described and shown.

What I claim and desire to secure by Letters Patent is:

1. In a power propelled vehicle, the combination with the means for controlling the operation of the vehicle, a universal lubricating device comprising a lubricant container having a plurality of discharge openings and divided into two compartments, one serving for oil and the other for grease, and a common valve operated from said first named means to open or close said openings simultaneously.

2. In a power propelled vehicle, the combination with the means for controlling the operation of the vehicle of a universal lubricating device comprising a lubricant container divided into two compartments, one to serve for grease and the other for oil and having in its bottom concentric rows of discharge openings, a rotary valve below the bottom of said opening operated from said first named means and serving to close or open all said openings simultaneously.

3. A lubricating device comprising two interengaged cylinders, one serving as a grease container and the other as oil container discharge openings arranged in the bottom of said cylinders in concentric rows, a rotary valve disk below the bottom of said containers to close all said discharge openings simultaneously, and means for the attachment of pipes to convey the lubricant from the discharge openings to different parts of a machine.

4. A universal lubricating cup comprising interengaged concentric cylinders capable of communicating with one another at their bottom when used for the same kind of lubricant, and a valve for closing communication, when said cylinders are each used for different kinds of lubricants.

5. In a grease cup, a self advancing plunger, a bottom formed with discharge openings, and longitudinally flattened plugs removably fitted in said openings to vary the size of the latter.

6. In a lubricating device two interengaged concentric cylinders, each having a circular row of discharge openings, the two rows being concentric to one another, a rotary disk having concentric openings corresponding in size and spacing with those of the discharge openings and serving as a valve, a support carrying said cylinders and pipe connections leading from said support and adapted to communicate with said discharge openings.

7. In a power propelled vehicle, the combination with the means for controlling the operation of the vehicle, a universal lubricating device comprising a lubricant container having a plurality of discharge openings and divided into two compartments, one serving for oil and the other for grease, and a common valve operated from said first named means to open or close said openings simultaneously, and means removably fitted in the discharge openings and one of the compartments to vary the size thereof.

In testimony whereof I affix my signature in presence of two witnesses.

CARL GUGGENBUEHLER.

Witnesses:
MAX D. ORDMANN,
JOSEPH T. MCMAHON.